United States Patent [19]

Hosokawa et al.

[11] Patent Number: 5,409,965
[45] Date of Patent: Apr. 25, 1995

[54] ABRASION RESISTANT COATING COMPOSITION COMPRISING A CABOXYLATE-CONTAINING POLYFUNCTIONAL ACRYLATE AND SILICA SOL

[75] Inventors: Noritaka Hosokawa; Kazuhide Hayama, both of Yokkaichi, Japan

[73] Assignee: Mitsubishi Petrochemical Co., Ltd., Tokyo, Japan

[21] Appl. No.: 279,890

[22] Filed: Jul. 26, 1994

[30] Foreign Application Priority Data

Jul. 30, 1993 [JP] Japan .................................. 5-190291

[51] Int. Cl.⁶ ...................... C08F 2/50; C08F 267/02; C08K 3/36
[52] U.S. Cl. .......................................... 522/83; 522/84; 522/104; 522/107; 522/121; 522/179
[58] Field of Search .................... 522/83, 84, 104, 107, 522/179, 121

[56] References Cited

U.S. PATENT DOCUMENTS

| | | | |
|---|---|---|---|
| 3,551,246 | 12/1970 | Bassemir et al. | 522/107 |
| 3,923,523 | 12/1975 | Nishikubo et al. | 522/107 |
| 4,291,097 | 9/1981 | Kamada et al. | 428/412 |
| 4,486,504 | 12/1984 | Chung | 522/83 |
| 4,772,660 | 9/1988 | Kitamura et al. | 522/83 |
| 4,973,612 | 11/1990 | Cottington et al. | 522/84 |
| 5,075,348 | 12/1991 | Revis et al. | 522/84 |
| 5,086,087 | 2/1992 | Misev | 522/83 |
| 5,089,291 | 2/1992 | Hayama et al. | 522/121 |

*Primary Examiner*—Susan W. Berman
*Attorney, Agent, or Firm*—Oblon, Spivak, McClelland, Maier & Neustadt

[57] ABSTRACT

An active energy ray-curing abrasion resistant coating composition is provided by incorporating following components: (a) a carboxylate-containing polyfunctional acrylate obtained by reacting a tetracarboxylic dianhydride and a hydroxyl group-containing polyfunctional acrylate having hydroxyl group(s) and at least three acryloyl groups and then neutralizing the reaction product; (b) a polyfunctional acrylate having at least three acryloyl groups; (c) an organic solvent; and (d) a photopolymerization initiator. The composition may comprise in addition to the components (e) a silica sol in an organic solvent as a dispersion medium. The composition may further comprise in addition to the components (f) an acrylic resin. Such composition is an active energy ray-curing abrasion-resistant coating composition which forms a film having excellent adhesion to a plastic sustrate, transparency, abrasion resistance and antistatic properties.

6 Claims, No Drawings

ABRASION RESISTANT COATING COMPOSITION COMPRISING A CABOXYLATE-CONTAINING POLYFUNCTIONAL ACRYLATE AND SILICA SOL

BACKGROUND OF THE INVENTION

1. Field of the Invention

The present invention relates to an active energy ray-curing abrasion-resistant coating composition which is cured by irradiation with active energy rays, and which forms a film having excellent adhesion to a plastic base material, transparency, abrasion resistance and antistatic properties. The present invention also relates to an active energy ray-curing abrasion-resistant coating composition which forms a film when a solvent dries off, which permits processing such as molding, printing and transfer before irradiation with active energy rays, and which forms a film having excellent abrasion resistance and antistatic properties.

2. Discussion of the Background

Plastic articles, for example, polycarbonate, polymethyl methacrylate, polyethylene terephthalate, triacetyl cellulose, vinyl chloride resins, ABS resins, etc., are generally used for various applications because of their light weight, excellent processability and impact resistance. However, since the surfaces of such plastic articles are easily scratched because of their low surface hardness thereof, and since transparent resins such as polycarbonate and the like have the drawback that the intrinsic transparency or appearance possessed by the resins significantly deteriorate, these plastic articles have difficulties being used in fields which require abrasion resistance. There is thus demand for an active energy ray-curing hard coating material which imparts abrasion resistance to the surfaces of these plastic articles. However, a cured layer comprising a general active energy ray-curing hard coating material has the drawback that static electricity is easily generated due to the high value of surface resistivity. This charging of static electricity promotes the adhesion of dust and causes deterioration in these attaractive appearance and transparency of the articles. In order to avoid such drawbacks, there is demand for an active energy ray-curing resin which imparts abrasion resistance and antistatic properties to the surfaces of these plastic articles.

In addition, when the surfaces of these plastic articles are subjected to hard coating treatment, printing and molding may be performed before curing by active energy rays. Alternatively, a hard coating material may be coated on another substrate, and if required, after processing such as printing, forming of an adhesive layer, the hard coating layer may be then transferred to the surface of the desired plastic article. There is thus demand for an active energy ray-curing resin which can form a film at the time a solvent dries off and which has excellent abrasion resistance and antistatic properties by irradiation with active energy rays.

It has been proposed to use as the active energy-ray curing resin having abrasion resistance, antistatic properties and transparency, for example, a mixture of at least bifunctional (meth)acrylate and an active energy-ray curing resin having antistatic properties such as polyethyleneoxide-containing (meth)acrylate (Japanese Patent Publication No. 49-14859), quaternary ammonium salt-containing (meth)acrylate (Japanese Patent Publication No. 49-22952), phosphate-type (meth)acrylate, ethanolamine compound (Japanese Patent Laid-Open No. 55-86847) or the like. However, since the active energy ray-curing resins having antistatic properties comprise mono- or bi-functional (meth)acrylate, the mixture causes the problem of deteriorating abrasion resistance which is the initial purpose of the resin.

SUMMARY OF THE INVENTION

As a result of earnest investigation, the inventors were able to solve the above problems.

The present invention provides an active energy ray-curing abrasion-resistant coating composition comprising:

(a) a carboxylate-containing polyfunctional acrylate obtained by reacting a tetracarboxylic dianhydride and a hydroxyl group-containing polyfunctional acrylate having hydroxyl group(s) and at least three acryloyl groups in its molecule, and then neutralizing the reaction product with sodium hydroxide or potassium hydroxide;

(b) a polyfunctional acrylate having at least three acryloyl groups in its molecule;

(c) an organic solvent; and, if required, (d) a photopolymerization initiator;

wherein the ratio by weight of component (a)/component (b) is at least 0.2.

The present invention also provides an active energy ray-curing abrasion-resistant coating composition comprising, in addition to the components of the above composition, (e) a silica sol in an organic solvent as a dispersion medium.

The present invention further provides an active energy ray-curing abrasion resistant coating composition comprising, further in addition to the components of the above composition, (f) an acrylic resin. This composition forms a film at the time the solvent dries off, can be subjected to processing such as molding, printing, transfer and so on, and can form a film having excellent abrasion resistance and antistatic properties by irradiation with active energy rays.

DETAILED DESCRIPTION OF THE INVENTION

The present invention will be described in detail below.

Component (a)

Component (a) is a carboxylate-containing polyfunctional acrylate obtained by reacting a tetracarboxylic dianhydride and a hydroxyl group-containing polyfunctional acrylate having hydroxyl group(s) and at least three acryloyl groups in its molecule, and then neutralizing the reaction product with sodium hydroxide or potassium hydroxide.

Examples of tetracarboxylic dianhydrides include pyromellitic dianhydride, 3,3',4,4'-benzophenone tetracarboxylic dianhydride, 4,4'-biphthalic anhydride, 4,4'-oxodiphthalic anhydride, 4,4'-(hexafluoroisopropylidene) diphthalic anhydride, 1,2,3,4-cyclopentanetetracarboxylic dianhydride, 5-(2,5-dioxotetrahydrofuryl)-3-methyl-3-cyclohexene-1,2-dicarboxylic anhydride, 4-(2,5-dioxotetrahydrofuran-3-yl)-tetralin-1,2-dicarboxylic anhydride, 3,4,9,10-perylenetetracarboxylic dianhydride, bicyclo[2,2,2]octo-7-ene-2,3,5,6-tetracarboxylic dianhydride and the like.

Examples of hydroxyl group-containing polyfunctional acrylates having hydroxyl group(s) and at least three acryloyl groups in its molecule include pentaerythritol triacrylate, dipentaerythritol tetraacrylate, dipentaerythritol pentaacrylate, and mixtures thereof.

The reaction of a tetracarboxylic dianhydride and a hydroxyl group-containing polyfunctional acrylate having hydroxyl group(s) and at least three acryloyl groups in its molecule is effected by mixing at a molar ratio of the hydroxyl group-containing polyfunctional acrylate/the tetracarboxylic dianhydride of at least 1 and stirring the mixture at 60° C. to 110° C. for 1 to 20 hours. This reaction can be effected in the presence of a polyfunctional acrylate having at least three acryloyl groups in its molecule as component (b) and an organic solvent having no active hydrogen atom of organic solvents which can be used as component (c).

In order to prevent polymerization by the acryloyl groups during reaction, it is preferred to use a polymerization inhibitor such as hydroquinone, hydroquinone monomethyl ether, catechol, p-t-butylcatechol, phenothiazine or the like. The amount of the polymerization inhibitor used is 0.01 to 1% by weight, preferably 0.05 to 0.5% by weight, relative to the reaction mixture.

In order to promote the reaction, it is also possible to use a catalyst such as N,N-dimethylbenzylamine, triethylamine, tributylamine, triethylenediamine, benzyltrimethylammonium chloride, benzyltriethylammonium bromide, tetramethylammonium bromide, cetyltrimethylammonium bromide, zinc oxide or the like. The amount of the catalyst used is generally 0.01 to 5% by weight of the monomer mixture.

The reaction product is neutralized by adding sodium hydroxide or potassium hydroxide which is dissolved in methyl alcohol, ethyl alcohol or isopropyl alcohol to obtain the carboxylate-containing polyfunctional acrylate.

Since the thus-obtained carboxylate-containing polyfunctional acrylate contains 3 to 10 acryloyl groups and 2 to 3 carboxylate groups in its molecule, even if mixed with a polyfunctional acrylate as component (b), a hard coating material having excellent abrasion resistance and antistatic properties can be obtained without decrease in the concentration of the acryloyl groups.

Component (b)

Component (b) is a polyfunctional acrylate having at least three acryloyl groups in its molecule. Examples of such polyfunctional acrylates include trimethylolpropane triacrylate, ethylene oxide-modified trimethylolpropane triacrylate, propylene oxide-modified trimethylolpropane triacrylate, tris(acryloyloxyethyl)isocyanurate, caprolactone-modified tris(acryloyloxyethyl)isocyanurate, pentaerythritol triacrylate, pentaerythritol tetraacrylate, dipentaerythritol tetraacrylate, dipenta-erythritol pentaacrylate, dipentaerythritol hexaacrylate, alkyloyl-modified dipentaerythritol triacrylate, alkyloyl-modified pentaerythritol tetraacrylate, alkyloyl-modified dipentaerythritol pentaacrylate, caprolactone-modified dipentaerythritol hexaacrylate, and mixtures of at least two of the compounds. Of these compounds, dipentaerythritol hexaacrylate, dipentaerythritol pentaacrylate and mixtures thereof are preferred from the viewpoint of abrasion resistance.

The ratio by weight of component (a)/component (b) is preferably at least 0.2, more preferably 0.5 to 100. If the ratio is less than 0.2, sufficient antistatic properties cannot be obtained.

Component (c)

Examples of organic solvents include aromatic hydrocarbons such as toluene, xylene and the like; esters such as ethyl acetate, propyl acetate, butyl acetate and the like; alcohols such as methyl alcohol, ethyl alcohol, n-propyl alcohol, isopropyl alcohol, n-butyl alcohol, and the like; ketones such as acetone, methyl ethyl ketone, methyl isobutyl ketone, cyclohexanone and the like; ethers such as 2-methoxyethanol, 2-ethoxyethanol, 2-butoxyethanol, ethylene glycol dimethyl ether, ethylene glycol diethyl ether, diethylene glycol dimethyl ether and the like; ether esters such as 2-methoxyethyl acetate, 2-ethoxyethyl acetate, 2-butoxyethyl acetate and the like. These solvents may also be used in combination.

The organic solvents is used for adjusting the viscosity of the active energy ray-curing coating composition of the present invention, and for producing component (f). Of the organic solvents, an organic solvent having no active hydrogen atom is used for producing component (a).

Component (d)

When ultraviolet rays are used as the active energy rays, (d) a photopolymerization initiator is used in addition to the above components (a) to (c). Examples of photopolymerization initiators include benzoin methyl ether, benzoin ethyl ether, benzoin isopropyl ether, benzoin butyl ether, diethoxyacetophenone, benzyldimethyl ketal, 2-hydroxy-2-methylpropiophenone, 1-hydroxycyclohexyl phenyl ketone, benzophenone, 2,4,6-trimethylbenzoin diphenylphosphine oxide, 2-methyl-[4-(methylthio)phenyl]-2-morpholino-1-propanone, 2-benzyl-2-dimethylamino-1-(4-morpholinophenyl)-butane-1-one, Michler's ketone, isoamyl N,N-dimethylaminobenzoate, 2-chlorothioxanthone, 2,4-diethylthioxanthone and the like. These photopolymerization initiators may be used in a combination of at least two of the compounds. The amount of the photopolymerization initiator is 0.1 to 10 parts by weight, preferably 1 to 5 parts by weight, relative to 100 parts by weight of the total amount of component (a) and component (b).

Component (e)

A silica sol as component (e) in an organic solvent as a dispersion medium is added to the active energy ray-curing abrasion resistant coating composition comprising the above components (a) to (d) to obtain an active energy ray-curing abrasion resistant coating composition which has improved abrasion resistance and antistatic properties.

Component (e) is a silica sol in an organic solvent as a dispersion medium. For example, methyl alcohol, isopropyl alcohol, n-butyl alcohol, isobutyl alcohol, ethylene glycol, ethyl cellosolve, dimethylactoamide, xylene or a solvent mixture thereof is used as a dispersion medium, the silica particle size is 5 to 30 nm, and the solid content is 10 to 40%. A silica sol containing isopropyl alcohol, n-butyl alcohol, isobutyl alcohol, ethyl cellosolve, xylene or a solvent mixture thereof as a dispersion medium is particularly preferred from the viewpoint of the good miscibility with the carboxylate-containing polyfunctional acrylate used as component (a) obtained from tetracarboxylic dianhydride, and the polyfunctional acrylate having at least three acryloyl groups in its molecule used as component (b), and the transparency of the obtained film.

The ratio by weight of silica sol solid content of component (e)/{component (a)+component (b)} is preferably 2 or less. With a retio by weight which exceeds 2, the crosslinking formation between acryloyl groups of component (a) and those of component (b) decreases accompanied by degraded abrasion resistance.

Component (f)

By adding an acrylic resin as component (f) to the active energy ray-curing abrasion resistant coating composition comprising above mentioned components (a) to (e), an active energy ray-curing abrasion resistant coating composition which forms a film at the time the solvent dries off, which can be subjected to processing such as molding, printing and transfer, and which forms a film having excellent abrasion resistance and antistatic properties after irradiation with active energy rays can be obtained.

Examples of acrylic resins which can be used as component (f) include the following compounds (1), (2) and (3):

(1) Polymers or copolymers of (meth) acrylic acid esters:

(Meth)acrylate polymers or copolymers such as polymers of monomer (I) having a (meth)acryloyl group or copolymers of at least two monomers (I), for example, methacrylic acid and acrylic acid (referred to as "(meth)acrylic acid" hereinafter), methyl (meth)acrylate, ethyl (meth)acrylate, n-butyl (meth)acrylate, iso-butyl (meth)acrylate, 2-ethylhexyl (meth)acrylate, benzyl (meth)acrylate, cyclohexyl (meth)acrylate, isobornyl (meth)acrylate, dicyclopentenyl (meth)acrylate, dicyclopentenyl-oxyethyl (meth)acrylate, cyanoethyl (meth)acrylate, glycidyl (meth)acrylate, 2-hydroxyethyl (meth)acrylate, 2-hydroxypropyl (meth)acrylate and the like are included herein.

(2) Polymers or copolymers of (meth)acrylic acid esters having (meth)acryloyl groups in side chains thereof:

Compounds of (meth)acrylate polymer or copolymers having (meth)acryloyl groups in side chains, such as (meth)acrylic acid addition products of glycidyl (meth)acrylate polymers or copolymers containing glycidyl (meth)acrylate as a component, glycidyl (meth)acrylate addition products of copolymers containing (meth)acrylic acid as a component, addition compounds of the products of polyisocyanate and hydroxyl gruop-containing (meth)acrylate to copolymers containing hydroxyl group-containing (meth)acrylate as a component and the like are included herein.

(3) Acrylic silicone resins having alkoxysilyl groups:

Acrylic silicone resins having alkoxysilyl groups are copolymers comprising the monomer (I) having (meth)acryloyl group and monomer (II) having alkoxysilyl group which reacts with monomer (I).

Examples of monomer (II) include compounds having polymerizable unsaturated double bonds which are copolymerizable with the monomer (I), such as γ-methacryloyloxypropyl trimethoxysilane, γ-methacryloyloxypropyl triethoxysilane, γ-methacryloyloxypropylmethyl dimethoxysilane, vinyltrimethoxysilane, vinyltriethoxysilane, vinyltri(ethoxymethoxy)silane and the like; compounds having functional groups which produce addition reaction with the monomer (I), such as γ-glycidoxypropyl trimethoxysilane, γ-glycidoxylpropylmethyl diethoxysilane, γ-isocyanatopropyl trimethoxysilane, γ-isocyanatopropyl triethoxysilane, γ-isocyanatopropylmethyl dimethoxysilane, γ-isocyanatopropylmethyl diethoxysilane, γ-aminopropyl trimethoxysilane, γ-aminopropyl triethoxysilane, N-phenyl-γ-aminopropyl trimethoxysilane, γ-mercaptopropyl trimethoxysilane, γ-mercaptopropyl triethoxysilane and the like.

The acrylic silicone resins having alkoxysilyl groups are obtained by copolymerization between monomer (I) having (metha)acryloyl groups and monomer (II) having unsaturated double bonds which are copolymerizable with monomer (I) and alkoxysilyl groups. The acrylic silicone resins having alkoxysilyl groups can also be obtained by addition reaction between monomer (I) having (meth) acryloyl groups and monomer (II) having functional groups which produce addition reaction with monomer (I) and alkoxysilyl groups, followed by the polymerization of the reaction product. Alternatively, the acrylic silicone resin may be obtained by polymerization of monomer (I) having (meth)acryloyl groups, followed by addition reaction between the polymer obtained and monomer (II) having alkoxysilyl groups and functional groups which produce addition reaction with monomer (I).

The acrylic resin used as component (f), for example, any one of the compounds (1) to (3), can be produced by polymerization reaction of monomers (I) and (II) in an organic solvent as component (c) by an ordinary method, or addition reaction thereof as required.

Preferred examples of polymerization initiators used in the polymerization reaction include peroxides such as benzoyl peroxide, di-t-butyl peroxide, cumene hydroperoxide and the like; azo compounds such as azobisisobutyronitrile, azobisvaleronitrile and the like, all of which are ordinary radical polymerization initiators. The monomer concentration is generally 10 to 60% by weight, and the concentration of the polymerization initiator is generally 0.1 to 10% by weight relative to the monomer mixture.

In the case of an addition reaction, for example, addition reaction between epoxy and carboxyl groups, N,N-dimethylbenzylamine, triethylamine, tributylamine, triethylenediamine, benzyltrimethylammonium chloride, benzyltriethylammonium bromide, tetramethylammonium bromide, cetyltrimethylammonium bromide, triphenylstibine or the like can be used as a catalyst. The amount of the catalyst used is generally 0.1 to 5% by weight relative to the monomer mixture.

In the case of addition reaction between hydroxyl and isocyanate groups, di-n-butyltin dilaurate, triethylenediamine or the like can be used as a catalyst. The amount of the catalyst used is generally 0.01 to 0.1% by weight relative to the monomer mixture.

The ratio by weight of component (f)/{component (a)+component (b)+silica sol solid content of component (e)} is preferably 0.5 or less. With a ratio by weight which exceeeds 0.5, abrasion resistance and antistatic properties significantly deteriorate undesirably.

The active energy ray-curing abrasion resistant coating composition of the present invention can contain various additives which are added to this type of composition to improve the physical properties of films, such as an ultraviolet absorber (for example, benzotriazole, benzophenone, salicylic acid or cyanoacrylate ultraviolet absorber), an ultraviolet stabilizer (for example, hindered amine ultraviolet stabilizer), an antioxidant (for example, phenol, sulfur or phosphorus antioxidant), an antiblocking agent, a slipping agent, a leveling agent and so on.

The coating composition of the present invention can be coated on a plastic substrate such as polycarbonate, polymethyl methacrylate, polyethylene terephthalate, triacetyl cellulose, vinyl chloride resin or ABS resin using a coating machine according to coating methods such as a dipping, flow coating, spraying, bar coating methods, and gravure coating, roll coating, blade coating, or air-knife coating under conditions for obtaining hard coating layer of 1 to 50 μm, preferably 3 to 20 μm, on the surface of the plastic substrate after drying off the solvent and then irradiation with active energy rays. When the coating composition contains an acrylic resin as component (f), after the solvent dried off, printing, embossing, molding etc. may be performed as needed.

Ultraviolet rays emitted from a light source such as a xenon lamp, a low-pressure mercury lamp, a high-pressure mercury lamp, an ultra-high pressure mercury lamp, a metal halide lamp, a carbon arc lamp, or a tungsten lamp; or electron beams, α-ray, β-rays or γ-rays normally emitted from a 20 to 2000 kev electron beam accelerator can be used for crosslinking and curing the applied hard coating layer.

The present invention constructed as described above provides an active energy ray-curing coating composition which forms a film having excellent adhesion to a plastic substrate, transparency, abrasion resistance and antistatic properties by being irradiated with active energy rays. The composition can also form a film at the time a solvent dries off, and can form a film having excellent abrasion resistance by irradiation with active energy rays after processing such as molding, printing, transfer, etc. The composition can be used for various applications.

EXAMPLES

Methods of the present invention are illustrated with reference to the following examples, but the invention is not intended to be limited only thereto.

The parts and the percentage in the following Examples denote parts by weight and % by weight, respectively.

EXAMPLE 1

163 parts of a mixture of dipentaerythritol hexaacrylate and dipentaerythritol pentaacrylate (manufactured by Nippon Kayaku Co., Ltd., Kayarad DPHA, hydroxyl value of 69 mg KOH/g) containing 67 mol % of dipentaerythritol pentaacrylate, and 21.8 parts of pyromellitic dianhydride were charged in a flask at a molar ratio of dipentaerythritol pentaacrylate/pyromellitic dianhydride of 2. 100 parts of methyl ethyl ketone, 0.1 part of hydroquinone monomethyl ether and 1 part of N,N-dimethylbenzylamine were then added to the flask, followed by reaction at 80° C. for 8 hours. The reaction product was then neutralized by adding a solution obtained by dissolving 13.2 parts of 85% potassium hydroxide in 132 parts of isopropyl alcohol. The thus-obtained composition (I) contained 46% of solid consisting of 32.5% of carboxylate-containing polyfunctional acrylate and 13.5% of dipentaerythritol hexaacrylate.

1 part of benzyl dimethyl ketal was added to 100 parts of the obtained composition (I) to prepare an active energy ray-curing coating composition (A).

The active energy ray-curing coating composition (A) was coated on a transparent polycarbonate plate having a thickness of 2 mm by a bar coater so that the film thickness after drying was 10 μm, and then dried by heating at 100° C. for 10 minutes. The film was then ultraviolet-cured by irradiation with ultraviolet rays using a high-pressure mercury lamp which had an output of 7.5 kW and an output, density of 120 W/cm and which was vertically placed in the direction so that a sample passed through at a position 10 cm below the light source, under the condition of a conveyor speed of 2 m/min.

The adhesion between the polycarbonate plate and the hard coating layer formed thereon was evaluated as follows: By cutting the hard coating layer with a cutter knife 100 one $mm^2$ cross-cut squares were prepared; a cellophane tape manufactured by Nichiban was adhered to the film using pressure and then forcibly peeled off; retained squares on the plastic substrate out of 100 squares were counted. As a result, good adhesion of 100/100 was obtained (cross-cut tape method JIS K5400).

After hard-coating, the resultant polycarbonate plate was evaluated for transparency as haze (%). The haze was 0.5% which showed good transparency. The haze of the polycarbonate plate having a thickness of 2 mm before hard coating treatment was 0.4%.

Haze is represented by the following equation: $Td/Tt \times 100$, wherein Td is transmittance of scattered light and Tt is total light transmittance, according to JIS K7105.

The abrasion resistance was evaluated by measuring a difference ΔH between the hazes before and after the Taber abrasion test which was performed with 100 turns and a load of 500 g by using truck wheel CS-10F produced by Calibrase Corp. As a result, ΔH was as small as 5.0% which showed good abrasion resistance. As a result of the same Taber abrasion test using a polycarbonate plate of 2 mm thick which was not subjected to hard coating treatment, ΔH was 46.7% (Taber abrasion test method ASTM D1044).

The hard-coated polycarbonate plate was then allowed to stand in a constant-temperature room at 23° C. and a relative humidity of 60% for 24 hours, after which the intrinsic surface resistivity value was measured. The obtained value was $1.1 \times 10^{11}$ Ω/cm which indicated good antistatic properties.

EXAMPLE 2

86 parts of a mixture (produced by Osaka Organic Chemical Industry Ltd., Viscoat 300, hydroxyl value 131 mg KOH/g) of pentaerythritol tetraacrylate and pentaerythritol triacrylate containing 73 mol % of pentaerythritol triacrylate and 21.8 parts of pyromellitic dianhydride were charged in a flask so that the molar ratio of pentaerythritol triacrylate/pyromellitic dianhydride was 2. 100 parts of methyl ethyl ketone, 0.1 part of hydroquinone monomethyl ether and 1 part of N,N-dimethylbenzylamine were added to the resultant mixture, followed by reaction at 80° C. for 8 hours. The reaction product was then neutralized by adding a solution obtained by dissolving 13.2 parts of 85% potassium hydroxide in 132 parts of isopropyl alcohol. The thus-obtained composition (II) contained 34.3% of solid consisting of 26.8% of carboxylate-containing polyfunctional acrylate and 7.5% of pentaerythritol tetraacrylate.

1 part of benzyl dimethyl ketal was mixed with 100 parts of the obtained composition (II) to obtain an active energy ray-curing coating composition (B).

A hard-coated polycarbonate plate was obtained by the same method as that employed in Example 1 except that active energy ray-curing coating composition (B) was used.

Evaluation of adhesion, transparency, abrasion resistance and surface resistivity value by the same methods as that employed in Example 1 yielded good results including adhesion of 100/100, haze of 0.5%, ΔH of 6.9% and a surface resistivity value of $1.8 \times 10^8$ Ω/cm.

EXAMPLE 3

163 parts of Kayarad DFHA which was the same as that used in Example 1 and 26.4 parts of 5-(2,5-dioxotetrahydrofuryl)-3-methyl-3-cyclohexene-1,2-dicarboxylic anhydride were charged in a flask so that the molar ratio of dipentaerythritol pentaacrylate/5-(2,5-dioxotetrahydrofuryl)-3-methyl-3-cyclo hexene-1,2-dicarboxylic anhydride was 2. 100 parts of methyl ethyl ketone, 0.1 parts of hydroquinone monomethyl ether and 1 part of N,N-dimethylbenzylamine were added to the resultant mixture, followed by reaction at 80° C. for 8 hours. The reaction product was then neutralized by adding a solution obtained by dissolving 13.2 parts of 85% potassium hydroxide in 132 parts of isopropyl alcohol. The thus-obtain composition (III) contained 46.6% of solid consisting of 33.2% of carboxylate-containing polyfunctional acrylate and 13.4% of dipentaerythritol hexaacrylate.

1 part of benzyl dimethyl ketal was mixed with 100 parts of the obtained composition (III) to obtain an active energy ray-curing coating composition (C).

A hard-coated polycarbonate plate was obtained by the same method as that employed in Example 1 except that active energy ray-curing coating composition (C) was used.

Evaluation of adhesion, transparency, abrasion resistance and surface resistivity value by the same methods as that employed in Example 1, yielded good results including adhesion of 100/100, haze of 0.4%, ΔH of 5.5% and a surface resistivity value of $3.2 \times 10^{11}$ Ω/cm.

EXAMPLE 4

A polyethylene terephthalate film subjected to hard coat treatment was obtained by the same method as that employed in Example 1 except that a 100 μm thick transparent polyethylene terephthalate film was used in place of the 2 mm thick transparent polycarbonate plate.

Evaluation of adhesion between the polyethylene terephthalate film and the hard coat layer formed thereon, yielded good adhesion of 100/100.

The resultant hard-coated polyethylene terephthalate film was evaluated for transparency as haze (%). Haze was 3.5% which showed good transparency. Haze of the polyethylene terephthalate film of 100 μm thick before hard coating treatment was 3.7%.

Abrasion resistance evaluation resulted in ΔH of 4.8% which showed good abrasion resistance. ΔH of the polyethylene terephthalate film which had a thickness of 100 μm and which was not subjected to hard coating treatment was 23.1%.

Also the good result of a surface resistivity value of $1.5 \times 10^{11}$ Ω/cm was obtained.

EXAMPLE 5

100 parts of the composition (I) obtained in Example 1, 66 parts of silica sol (produced by Nissan Chemical Industries Ltd., IPA-ST, solid content 30%) containing isopropyl alcohol as a dispersion medium, and 1 part of benzyl dimethyl ketal were mixed to obtain an active energy ray-curing coating composition (D).

A hard-coated polycarbonate plate was obtained by the same method as that employed in Example 1 except that active energy ray-curing coating composition (D) was used.

Evaluation of adhesion, transparency, abrasion resistance and surface resistivity value by the same methods as that employed in Example 1 produced good results including adhesion of 100/100, haze of 0.5%, ΔH of 2.5% and a surface resistivity value of $4.0 \times 10^{10}$ Ω/cm.

EXAMPLE 6

100 parts of the composition (II) obtained in Example 2, 50 parts of silica sol (produced by Nissan Chemical Industries Ltd., IPA-ST, solid content 30%) containing isopropyl alcohol as a dispersion medium, and 1 part of benzyl dimethyl ketal were mixed to obtain an active energy ray-curing coating composition (E).

A hard-coated polycarbonate plate was obtained by the same method as that employed in Example 1 except that the active energy ray-curing coating composition (E) was used.

Evaluation of adhesion, transparency, abrasion resistance and surface resistivity value by the same methods as in Example 1 produced good results including adhesion of 100/100, haze of 0.4%, ΔH of 2.8% and a surface resistivity value of $8.0 \times 10^7$ Ω/cm.

EXAMPLE 7

0.3 part each of azobisisobutyronitrile was added to a mixture of 70 parts of methyl methacrylate, 30 parts of hydroxyethyl acrylate and 150 parts of methyl ethyl ketone when the mixture was heated to 80° C. and 2 hours later, followed by reaction at 80° C. for 8 hours to obtain a copolymer of methyl methacrylate and hydroxyethyl acrylate having a solid content of 40%.

100 parts of the composition (I) obtained in Example 1, 85 parts of silica sol (produced by Nissan Chemical Industries Ltd., IPA-ST, solid content 30%) containing isopropyl alcohol as a dispersion medium, 30 parts of the above obtained copolymer were mixed to obtain an active energy ray-curing coating composition (F).

The active energy ray-curing coating composition (F) was coated on a 2 mm thick transparent polycarbonate plate by a bar coater so that the film thickness after drying was 10 μm, and then dried by heating at 100° C. for 10 minutes. The dried surface of the polycarbonate plate had no tack, and it was thus recognized that the coating composition (F) has film-forming properties. This polycarbonate plate was then irradiated with electron beams at 5 Mrad under the conditions that the electron beam acceleration voltage was 175 keV, and the conveyor speed was 10 m/min to be cured with electron beams.

The evaluation of adhesion, transparency, abrasion resistance and surface resistivity value by the same methods as that employed in Example 1 produced good results including adhesion of 100/100, haze of 0.6%, ΔH of 6.2% and a surface resistivity value of $7.2 \times 10^{11}$ Ω/cm.

EXAMPLE 8

0.3 part each of azobisisobutyronitrile was added to a mixture of 90 parts of methyl methacrylate, 10 parts of γ-methacryloyloxypropyl trimethoxy silane and 150 parts of methyl ethyl ketone when the mixture was heated to 80° C. and 2 hours later, followed by reaction at 80° C. for 8 hours to obtain a 40% methyl ethyl ketone solution of acrylic silicone resin having alkoxysilyl groups.

100 parts of the composition (I) obtained in Example 1, 85 parts of silica sol (produced by Nissan Chemical Industries Ltd., IPA-ST, solid content 30%) and 30 parts of the above obtained acrylic silicone resin were mixed to obtain an active energy ray-curing coating composition (G).

A hard-coated polycarbonate plate was obtained by the same method as that employed in Example 7 except that active energy ray-curing coating composition (G) was used. The dried surface of the polycarbonate plate had no tack, and it was thus recognized that the coating composition (G) has film-forming properties.

Evaluation of adhesion, transparency, abrasion resistance and surface resistivity value by the same methods as that employed in Example 1 produced good results including adhesion of 100/100, haze of 0.5%, ΔH of 5.6% and a surface resistivity value of $8.5 \times 10^{11}$ Ω/cm.

COMPARATIVE EXAMPLE 1

30 parts of alkylphenoxy polyethylene glycol acrylate (produced by Dai-Ichi Kogyo Seiyaku Co., Ltd., New Frontier N177E) having antistatic properties, 15 parts of Kayarad DPHA which was the same as that used in Example 1, 55 parts of methyl ethyl ketone, and 1 part of benzyl dimethyl ketal were mixed to obtain an active energy ray-curing coating composition (H).

A hard-coated polycarbonate plate was obtained by the same method that employed as in Example 1 except that active energy ray-curing coating composition (H) was used.

As a result of evaluation of adhesion, transparency, abrasion resistance and surface resistivity value by the same methods as that employed in Example 1, adhesion of 100/100, haze of 0.5% and a surface resistivity value of $3.4 \times 10^{11}$ Ω/cm were found to be good, while ΔH of 28.5% indicated insufficient abrasion resistance.

COMPARATIVE EXAMPLE 2

26.4 parts of 2-acryloyloxyethyl phthalate (produced by Osaka Organic Chemical Industry Ltd., Viscoat 2000) obtained from phthalic anhydride and 2-hydroxyethyl acrylate was neutralized by adding a solution obtained by dissolving 6.6 parts of 85% potassium hydroxide in 66 parts of isopropyl alcohol. 90 parts of the thus-obtained carboxylate-containing acrylate (solid content 33.3%), 15 parts of Kayarad DPHA which was the same as that used in Example 1, and 1 part of benzyl dimethyl ketal were mixed to obtain an active energy ray-curing coating composition (J).

A hard-coated polycarbonate plate was obtained by the same method as that in Example 1 except that active energy ray-curing coating composition (J) was used.

As a result of evaluation of adhesion, transparency, abrasion resistance, and surface resistivity value by the same methods as that employed in Example 1, adhesion of 100/100, haze of 0.5% and a surface resistivity value of $8.0 \times 10^{10}$ Ω/cm were found to be good, while ΔH of 25.1% showed insufficient abrasion resistance.

COMPARATIVE EXAMPLE 3

163 parts of Kayarad DPHA which was the same as that used in Example 1, and 21.8 parts: of pyromellitic dianhydride were charged in a flask so that the molar ratio of dipenta-erythritol pentaacrylate/pyromellitic dianhydride was 2. 100 parts of methyl ethyl ketone, 0.1 part of hydroquinone monomethyl ether and 1 part of N,N-dimethylbenzylamine were added to the resultant mixture, followed by reaction at 80° C. for 8 hours.

1 part of benzyl dimethyl ketal was mixed with 100 parts of the reaction product to obtain an active energy ray-curing coating composition (K).

A hard-coated polycarbonate plate was obtained by the same method as that employed in Example 1 except that active energy ray-curing coating composition (K) was used.

As a result of evaluation of adhesion, transparency, abrasion resistance, and surface resistivity value by the same method as that employed in Example 1, adhesion of 100/100, haze of 0.4% and ΔH of 3.4% were found to be good, while a surface resistivity value of $>5.0 \times 10^{14}$ Ω/cm indicated the absence of antistatic properties.

What is claimed is:

1. An active energy ray-curing abrasion resistant coating composition comprising:
   (a) a carboxylate-containing polyfunctional acrylate obtained by reacting a tetracarboxylic dianhydride and a hydroxyl group-containing polyfunctional acrylate having hydroxyl group(s) and at least three acryloyl groups in its molecule, and then by neutralizing the reaction product with sodium hydroxide or potassium hydroxide;
   (b) a polyfunctional acrylate having at least three acryloyl groups in its molecule;
   (c) an organic solvent; and if required,
   (d) a photopolymerization initiator,
   wherein the ratio by weight of component (a)/component (b) is at least 0.2.

2. A composition according to claim 1, further comprising (e) a silica sol in an organic solvent as a dispersion medium, wherein the ratio by weight of silica sol solid in component (e)/{component (a)+component (b)} is not more than 2.

3. A composition according to claim 2, further comprising (f) an acrylic resin, wherein the ratio by weight of component (f)/{component (a)+component (b)+silica sol solids in component (e)} is not more titan 0.5.

4. The composition according to claim 3, wherein the acrylic resin (f) is selected from the group consisting of following Compounds (1), (2) and (3):
   Compound (1): polymers or copolymers of (meth) acrylic acid esters;
   Compound (2): polymers or copolymers of (meth) acrylic acid esters having (meth) acryloyl groups in side chains thereof; and
   Compound (3): acrylic silicone resins having alkoxysilyl groups.

5. The composition according to any of claims 1 to 4, wherein said tetracarboxylic dianhydride is selected from the group consisting of pyromellitic dianhydride, 3,3',4,4'-benzophenonetetracarboxylic dianhydride, 4,4'-biphthalic anhydride, 4,4'-oxydiphthalic anhydride, 4,4'-(hexafluoroisopropylidene)diphthalic anhydride, 1,2,3,4-cyclopentanetetracarboxylic dianhydride, 5-(2,5-dioxotetrahydrofuryl)-3-methyl-3-cyclohexene-1,2-dicarboxylic anhydride, 4-(2,5-dioxotetrahydrofuran-3-yl)-tetralin-1,2-dicarboxylic anhydride, 3,4,9,10-perylenetetra-carboxylic dianhydride, and bicyclo[2,2,2]octo-7-ene-2,3,5,6-tetracarboxylic dianhydride.

6. The composition according to any of claims 1 to 4, wherein said hydroxyl group-containing polyfunctional acrylate having hydroxyl group(s) and at least three acryloyl groups in its molecule is selected from the group consisting of pentaerythrytol triacrylate, dipentaerythritol tetraacrylate and dipentaerythritol pentaacrylate.

* * * * *